United States Patent [19]

Hall

[11] Patent Number: 4,866,602

[45] Date of Patent: Sep. 12, 1989

[54] POWER SUPPLY FOR A COMPUTER PERIPHERAL DEVICE WHICH POSITIONS A CURSOR ON A COMPUTER DISPLAY

[75] Inventor: John C. Hall, Redmond, Wash.

[73] Assignee: Microsoft Corporation, Redmond, Wash.

[21] Appl. No.: 119,314

[22] Filed: Nov. 9, 1987

Related U.S. Application Data

[63] Continuation of Ser. No. 548,122, Nov. 2, 1983, abandoned.

[51] Int. Cl.⁴ .............................................. G06F 3/033
[52] U.S. Cl. .................................... 364/200; 340/710
[58] Field of Search ... 364/200 MS File, 900 MS File; 340/310 A, 310 R, 710, 709; 375/8, 121; 178/18

[56] References Cited

U.S. PATENT DOCUMENTS

| | | | |
|---|---|---|---|
| 3,852,721 | 12/1974 | Tucker et al. | 364/200 X |
| 4,007,360 | 2/1977 | Kneil et al. | 364/724 |
| 4,078,249 | 3/1978 | Lelke et al. | 364/200 |
| 4,204,249 | 5/1980 | Dye et al. | 364/200 |
| 4,312,035 | 1/1982 | Greene | 364/200 |
| 4,335,445 | 6/1982 | Nercessian | 364/900 |
| 4,419,740 | 12/1983 | Hevenor, Jr. | 364/900 |
| 4,435,764 | 3/1984 | El-Gohary | 364/200 |
| 4,514,726 | 4/1985 | Whetstone et al. | 340/710 |
| 4,521,772 | 6/1985 | Lyon | 340/710 |
| 4,538,073 | 8/1985 | Freige et al. | 364/200 |
| 4,556,865 | 12/1985 | Fukugawa et al. | 340/310 A X |
| 4,564,835 | 1/1986 | Dhawan | 340/710 |
| 4,578,533 | 3/1986 | Pierce | 375/8 X |
| 4,578,674 | 3/1986 | Baker et al. | 340/710 |
| 4,603,320 | 7/1986 | Farago | 375/121 X |
| 4,611,274 | 9/1986 | Machino et al. | 340/310 R X |
| 4,621,170 | 11/1986 | Picandet | 340/310 A X |
| 4,638,299 | 1/1987 | Campbell | 340/310 A |

OTHER PUBLICATIONS

Mouse P-4, Interactive Graphic Input Device, Depraz S. A., CH-1345 Le Lieu, Switzerland, Feb. 23, 1982.
SC817 Universal RS232 Smart Cable Advertisement Electronic Products Magazine, Apr. 18, 1983.

*Primary Examiner*—David L. Clark
*Attorney, Agent, or Firm*—Seed and Berry

[57] ABSTRACT

An improved peripheral device for a computer wherein the improvement comprises circuitry which derives power for the peripheral device from the control and data signal lines interconnecting the peripheral device to the computer. Preferably, the peripheral device is a mouse which uses a microprocessor to translate signals received from a pair of encoders. Power for the microprocessor is derived from a pair of control lines through the use of a voltage reference setting zener diode, a polarity maintaining diode and a current limiting resistor. For an RS-232-type interface, the TXD signal is used for ground and the RTS signal is used for positive voltage. The computer is programmed to provide a positive signal on the RTS line and a negative signal on the TXD line.

16 Claims, 1 Drawing Sheet

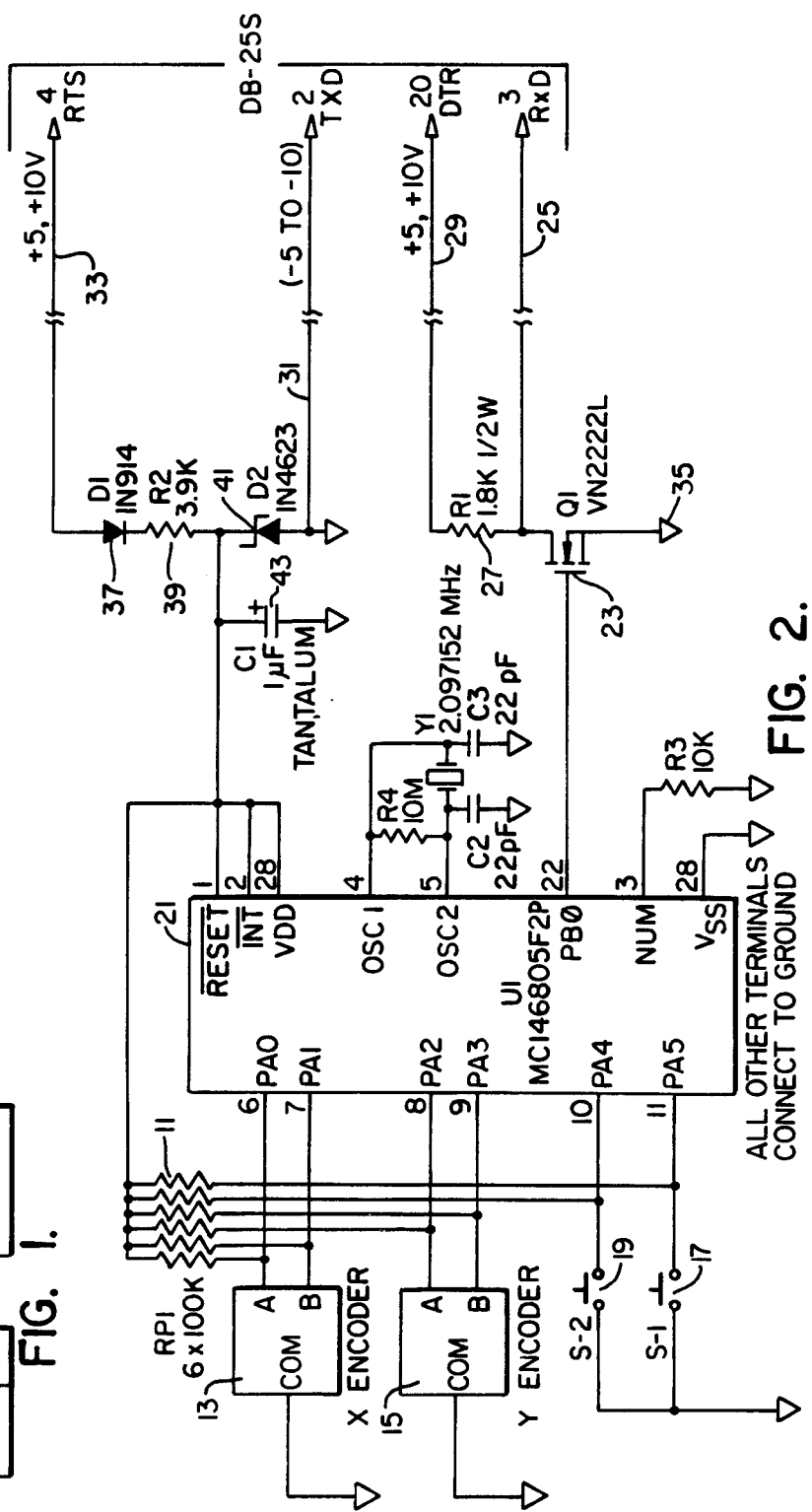

POWER SUPPLY FOR A COMPUTER PERIPHERAL DEVICE WHICH POSITIONS A CURSOR ON A COMPUTER DISPLAY

This is a continuation of application Ser. No. 548,122, filed Nov. 2, 1983, now abandoned.

BACKGROUND OF THE INVENTION

1. Field of the Invention

This invention relates to a computer graphic input device known as a mouse and, more specifically, to a power supply for such device.

2. Description of the Prior Art

A mouse is a computer input device typically used for positioning a cursor on a computer video display screen. A typical physical embodiment of a mouse includes a small enclosure containing X-Y motion sensors, one or more push buttons operable externally of the enclosure, electrical interface circuitry, and a cable to connect the circuitry to a host computer. In operation, when the mouse is moved on a flat surface by a user, the motion sensors in the mouse detect the movement and direction of the mouse in the X-Y plane. The interface circuitry, typically within the mouse, converts the motion data produced by the sensors into a digital form usable by the host computer. Software in the host computer then utilizes the motion data to perform a particular function, for example, repositioning of the cursor on the display screen. The mouse also usually is provided with one or more switches, often in the form of push buttons, to enable alteration of the program flow in the host computer.

Mice of the above described type are normally classified by the manner in which motion is detected, the principal motion detection methods being mechanical and optical. Mechanical mice usually employ a technique whereby a spherical ball protrudes slightly below the bottom of the mouse enclosure which is free to roll as the mouse is moved by the operator along a flat surface. Inside the enclosure, the rotating ball is coupled to a pair of orthogonally mounted shaft position encoders by small rubber wheels or the like. Mouse motion is thereby converted into two pairs of quadrature signals, one pair for each axis of motion, thereby providing the required direction and displacement information corresponding to mouse movement. Optical mice utilize a method whereby a light source in the base of the mouse is reflected onto one or more photodetectors by a specially patterned surface over which the mouse is moved. Typically, a single chip computer translates the changes in detected luminance into direction and displacement signals which are utilized by the host computer in the manner described above.

Mice may be further classified by the manner in which they interface with the host computer. The two common interface methods are parallel and serial. Mice employing a parallel interface usually connect to a specially designed, dedicated controller board installed in the host computer. The circuitry used to convert motion of the mouse into digital data may be located either on the controller board in the host computer, in the mouse itself, or divided between the two. In any event, the controller board provides the interconnection between the host computer and the mouse.

On the other hand, mice employing a serial interface typically are connected to a general purpose serial I/O port on the host computer of the type often used with other peripheral devices such as modems. One advantage of a serial mouse is that no special mouse controller board is required in the host computer to support operation of the mouse. As a consequence, all circuitry used in translating motion of the mouse into digital form is contained within the mouse itself, or within an additional enclosure external to the host computer.

The serial mouse typically utilizes a microcomputer, often with several discrete components, to translate the quadrature signals of the shaft encoders or the optical sensors into data packets that are transmitted to the host computer. Additionally, there is circuitry to perform the signal level conversion required by the serial interface standard employed (usually EIA Standard RS-232C). Data is commonly transmitted using an ordinary asynchronous serial protocol. Serial mice require an external power source, such as batteries or an externally located power supply connected to the mouse by a cable. Use of power supplied by batteries is inconvenient because of size and weight considerations, as well as the fact that the supply of power is dependent on battery life. On the other hand, the use of an externally located power supply usually requires an extra enclosure that must be connected to the primary AC power lines, as well as an additional cable to supply the power to the mouse. Both of these methods result in additional cost and complexity.

SUMMARY OF THE INVENTION

The invention overcomes the above problems by obtaining power for the mouse directly through signal lines normally used for other purposes but which form a part of the standard RS-232C serial interface. The serial mouse utilizes the RTS (Request To Send), DTR (Data Terminal Ready) and TXD (Transmit Data) signal lines of the host computer's RS-232C serial I/O interface as its power source. These lines, as defined by EIA Standard RS-232C, are normally used for data communication and handshake functions under control of the host computer, and are not intended to provide electrical power to any peripheral device attached thereto. However, in accordance with EIA Standard RS-232C, these signal lines are energized by line drivers capable of sourcing a few milliamperes of current at a minimum of 5 volts into a 3000 ohm load. The serial mouse of this invention is able to obtain all required electrical power through these three signal lines.

Because the above noted signals are available on the serial I/O ports of substantially all micro and mini computers, the serial mouse of this invention may be directly connected to the host computer interface without hardware modification, an external power source, or internal batteries. A software driver in the host computer is used to properly configure the control lines on the host computer serial interface.

BRIEF DESCRIPTION OF THE DRAWINGS

FIG. 1 is a block diagram showing a host computer with a mouse connected to a serial interface which is a part of the host computer; and FIG. 2 is a schematic diagram of a serial mouse in accordance with the present invention.

DESCRIPTION OF THE PREFERRED EMBODIMENT

FIG. 1 is a block diagram of a host computer 1 with an interface 3 which is connected by a cable 5 to a mouse 7. The host computer 1 includes a display device, usually a cathode ray tube, which is controlled by signals transmitted from the mouse through the cable 5 and the unmodified interface 3 to the host computer 1. The mouse 7 receives power for its operation via the unmodified interface 3 and along certain standard signal wires of the cable 5. In the preferred embodiment these signals are transmitted in accordance with the format defined by EIA Standard RS-232C.

In operation, in the preferred embodiment, the serial mouse sends a three-byte data package to the host computer whenever there is any change in the state of the mouse. A change of state is defined as any motion of the mouse or any change in the position of either of its buttons. The data packet sent to the host computer is an accumulation of all mouse activity that has occurred since transmission of the previous data packet. In other words, any mouse activity that occurs during the transmission of one data packet or thereafter will be accumulated for transmission in the succeeding data packet. This buffering technique allows the serial mouse to continuously track high mouse velocities while transmitting serially at a low baud rate, for example, 1200 baud. In the preferred embodiment each data packet sent by the mouse comprises three bytes. The format for each byte is:

|        | B6 | B5   | B4    | B3 | B2 | B1 | B0 |
|--------|----|------|-------|----|----|----|----|
| Byte 1 | 1  | LEFT | RIGHT | Y7 | Y6 | X7 | X6 |
| Byte 2 | 0  | X5   | X4    | X3 | X2 | X1 | X0 |
| Byte 3 | 0  | Y5   | Y4    | Y3 | Y2 | Y1 | Y0 |

Bit 6 (B6) is a sync bit, set for byte 1 of a data packet, reset otherwise.

LEFT represents the state of the left mouse button; a one (1) indicates the button is down (depressed), a zero (0) indicates that the button is up (released).

RIGHT represents the state of the right mouse button in the same manner as the left button.

X0–X7 is a signed, two's complement integer that represents the relative displacement of the mouse in the X-coordinate direction since the last data transmission. A positive value indicates mouse movement to the right, negative values indicate motion to the left.

Y0–Y7 is a signed, two's complement integer that represents the relative displacement of the mouse in the Y-coordinate direction since the last data transmission. A positive value indicates mouse movement downwards, negative values indicate motion upwards.

FIG. 2 is a schematic drawing of the circuit of a serial mouse 7. The circuitry may be disposed either in the mouse housing, at the host computer 1 connected to the interface 3, or divided between the two, as desired. The mouse 7 includes an X shaft encoder 13, a Y shaft encoder 15, a pair of switches 17 and 19 and resistors 11 connected between a source of voltage (explained below) and each of the output terminals of the encoders 13 and 15 and the switches 17, 19. Although two switches are shown, the number of switches provided is arbitrary, but generally is a relatively small number to simplify operation of the mouse. The output terminals from each of the encoders 13, 15 and switches 17, 19 are connected to I/O ports PA0 to PA5 respectively of a microcomputer 21. The encoders and switches are also connected to a local ground. As explained below this local ground is different from the host computer ground. At least the encoders 13, 15, and the switches 17, 19, will be located in the mouse enclosure. All or part of the remaining circuitry can be located within the mouse enclosure, or at the host computer, connected to the mouse by a cable. The encoders 13, 15 are standard shaft encoders of a type that can be purchased from ALPS Electric or from other sources.

Microcomputer 21 is preferably an 8 bit CMOS Motorola MC 146805F2, as described in Motorola publication ADI-879, copyright 1982 by Motorola, Inc. The microcomputer is configured as specified in the above publication with the ROM of the microcomputer being configured according to the source code of the attached Appendix. The code shown in the Appendix, when loaded into the ROM, allows the microcomputer to understand the meaning of a high or low signal on any particular input line and to generate the digital code transmitted from the mouse to the host computer. Power to drive the microcomputer 21 is applied to terminal VDD which receives a positive voltage of about 4.3 volts with respect to VSS. VSS is the local ground, a voltage in the −5 to −10 volt range relative to the host computer ground. The clock rate of the microcomputer is determined by the crystal controlled circuit connected across the microcomputer OSC inputs, about 2.1 MHz in the preferred embodiment.

The host computer is programmed to normally place a voltage of plus 5 to 10 volts in the Request To Send (RTS) line 33 and the Data Terminal Ready (DTR) line 29 and a voltage of minus 5 to 10 volts on the Transmit Data (TXD) line 31. The Receive Data (RXD) line 25 transmits signals from the microcomputer 21 serially to the host computer 1 via the interface 3. This is accomplished by controlling the gate of transistor 23 via signals from the output PBO of the microcomputer. The voltage on line 25 will be effectively local ground −5 to −10 volts with respect to host computer ground) if the transistor is conducting, or the voltage on line 29 (+5 to +10 volts with respect to host ground) if the transistor is not conducting. All ground terminals in the drawing are local ground. Thus the microcomputer ground VSS takes the voltage on line 31 which is a negative voltage relative to the host computer ground. This arrangement eliminates the necessity of an additional transistor for voltage referencing between the microcomputer and the host computer. All signals on lines 29, 31 and 33 are bipolar relative to the host computer ground.

In actual operation, under programmed control of the host computer, RTS line 33 will always be at a positive voltage, TXD line 31 will always be at a negative voltage, and DTR line 29 will always be at a positive voltage. The voltages on lines 29, 31 and 33 are utilized in accordance with the present invention as a power source to provide power to the microcomputer 21 across VDD and VSS and to the transistor 23. Diode 37 is provided to prevent the supply voltage to the microcomputer 21 from becoming negative at VDD with respect to local ground. Resistor 39 is a current limiting resistor and Zener diode 41 establishes a voltage reference for the microcomputer 21. The capacitor 43 is a filter capacitor to remove ripple components.

It is apparent from the above description that lines 29, 31 and 33, which in the prior art are used only for signalling functions, have been utilized to provide a source of power to a mouse circuit without requiring changes at the host computer or the computer interface. The use of these lines eliminates the need for a separate power source for the mouse.

Although the invention has been described with respect to a specific preferred embodiment thereof, variations and modifications will be apparent to those skilled in the art. It is therefore the intention that the appended claims be interpreted as broadly as possible in view of the prior art to include all such variations and modifications.

```
 1:
 2:
 3: AVOCET SYSTEMS 6805 CROSS-ASSEMBLER -   VERSION 1.06
 4:
 5: SOURCE FILE NAME: SMOUSEV2.ASM
 6:
 7:
 8:
 9:
10:
11: AVOCET SYSTEMS 6805 CROSS-ASSEMBLER -   VERSION 1.06
12:
13: SERIAL MOUSE DEVICE-RESIDENT SOFTWARE
14: EQUATES, STORAGE DEFINITIONS, TABLES
15:
16:
17:            ;
18:            ; ***** EQUATES *****
19:            ;
20: 0000       PADAT    EQU    00H      ; PORT A DATA REGISTER
21: 0001       PBDAT    EQU    01H      ; PORT B DATA REGISTER
22: 0004       PADIR    EQU    04H      ; PORT A DIRECTION REGISTER
23: 0005       PBDIR    EQU    05H      ; PORT B DIRECTION REGISTER
24: 0008       TIMDAT   EQU    08H      ; TIMER DATA REGISTER
25: 0009       TIMCTL   EQU    09H      ; TIMER CONTROL REGISTER
26:
27: 0001       SERTIM   EQU    01H      ; TIM CLRD, INTERNAL CLK, PRESCALE BY 2
28: 00D1       TIMCNT   EQU    209      ; TIMER COUNT (FOR 2.097152 MHZ CRYSTAL)
29:
30: 0001       B0OUT    EQU    01H      ; DIRECTION REGISTER MASK - BIT 0 OUTPUT
31: 0000       ALLIN    EQU    00H      ; DIRECTION REGISTER MASK - B0-7 INPUT
32:
33: 0000       MSKOPT   EQU    00H      ; XTAL CLK, PROGRAMMABLE TIMER
34:
35: 0000       QUADS    EQU    PADAT    ; MOUSE QUADRATURE SIGNALS IN
36:
37: 0000       BUTDAT   EQU    PADAT    ; MOUSE BUTTON DATA IN
38: 0001       SEROUT   EQU    PBDAT    ; SERIAL DATA OUT
39:
40: 0001       STOPBIT  EQU    01H      ; STOP BIT
41: 0040       SYNCBIT  EQU    40H      ; SYNC BIT
42: 000A       FRMSIZ   EQU    10       ; SERIAL FRAME SIZE- 1 STRT, 7 DATA, 2 STOP
43: 0002       NUMSB    EQU    2        ; NUMBER OF STOP BITS
44:
45: 0030       BUTMSK   EQU    30H      ; BUTTON MASK
46:
47: 0008       MAXCNT   EQU    08H      ; INITIAL BUTTON DEBOUNCE COUNT
48:
49: 004D       DIAGCH   EQU    4DH      ; ASCII 'M' IS DIAGNOSTIC CHARACTER
50:
51: 0001       RIGHT    EQU    1
52: FFFF       LEFT     EQU    -1
53: 0000       NOCHNG   EQU    0
54: 0000       ILLEGAL  EQU    0
55:
```

```
 56:
 57:               ; ***** PROGRAM VARIABLES *****
 58:
 59: 0040              ORG       40H              ; BEGINNING OF RAM SPACE IN 146805F2
 60:
 61: 0040    OLDX      DS        1
 62: 0041    XDIR      DS        1
 63: 0042    OLDY      DS        1
 64: 0043    YDIR      DS        1
 65:
 66:
 67:
 68:
 69: AVOCET SYSTEMS 6805 CROSS-ASSEMBLER - VERSION 1.06
 70:
 71: SERIAL MOUSE DEVICE-RESIDENT SOFTWARE
 72: EQUATES, STORAGE DEFINITIONS, TABLES
 73:
 74:
 75: 0044    XMTREG    DS        1              ; TRANSMIT SHIFT REGISTER
 76: 0045    NXTBIT    DS        1              ; NEXT SERIAL DATA BIT (IN LSB)
 77: 0046    BITCNT    DS        1              ; COUNTER OF BITS TO BE TRANSMITTED IN A FRAME
 78: 0047    PKTIDX    DS        1              ; INDEX INTO DATA PACKET
 79:
 80: 0048    DATPAK
 81: 0048    DELY      DS        1              ; DELTA Y ENTRY IN DATA PAK
 82: 0049    DELX      DS        1              ; DELTA X ENTRY IN DATA PAK
 83:
 84: 004A    QDTEMP    DS        1              ; TEMPORARY STORAGE
 85: 004B    TEMP      DS        1              ; TEMPORARY STORAGE
 86: 004C    DELTAX    DS        1              ; DELTA X COUNT
 87: 004D    DELTAY    DS        1              ; DELTA Y COUNT
 88: 004E    OLDBUT    DS        1              ; BUTTON HISTORY
 89: 004F    BUTCHG    DS      · 1              ; BUTTON CHANGE FLAG
 90: 0050    DEBNCD    DS        1              ; DEBOUNCED BUTTON DATA
 91: 0051    DBCNT     DS        1              ; DEBOUNCE COUNTER
 92:
 93:
 94:               ; ***** DATA TABLES *****
 95:
 96: 0080              ORG       80H              ;BEGINNING OF USER ROM SPACE IN 146805F2
 97:
 98: 0080 00  T.TABLE:  DB        NOCHNG
 99: 0081 FF            DB        LEFT
100: 0082 01            DB        RIGHT
101: 0083 00            DB        ILLEGAL
102: 0084 01            DB        RIGHT
103: 0085 00            DB        NOCHNG
104: 0086 00            DB        ILLEGAL
105: 0087 FF            DB        LEFT
106: 0088 FF            DB        LEFT
107: 0089 00            DB        ILLEGAL
108: 008A 00            DB        NOCHNG
109: 008B 01            DB        RIGHT
110: 008C 00            DB        ILLEGAL
111: 008D 01            DB        RIGHT
112: 008E FF            DB        LEFT
113: 008F 00            DB        NOCHNG
114:
```

```
115:
116:
117: AVOCET SYSTEMS 6805 CROSS-ASSEMBLER -  VERSION 1.56
118:
119: SERIAL MOUSE DEVICE-RESIDENT SOFTWARE
120: RESET ENTRY POINT - INITIALIZATION ROUTINES
121:
122:
123: 0090                    ;
124: 0090                    ; POWER-UP ENTRY POINT - INITIALIZE EVERYTHING
125: 0090                    ;
126: 0090         START:
127: 0090 9C              RSP                    ; RESET STACK POINTER
128: 0091 4F              CLRA                   ; CLEAR THE FOLLOWING VARIABLES
129: 0092 B744            STA     INTREG
130: 0094 B746            STA     BITCNT
131: 0096 B74C            STA     DELTAX
132: 0098 B74D            STA     DELTAY
133: 009A B74E            STA     OLDBUT
134: 009C B74F            STA     BUTCHG
135: 009E B750            STA     DEBNCD
136: 00A0 B741            STA     XDIR           ; DIRECTIONS INIT'D FOR MF'G TEST PURPOSE
137: 00A2 B743            STA     YDIR
138: 00A4 4A              DECA                   ; INITIALIZE FOLLOWING TO -1
139: 00A5 B747            STA     PKTIDX
140: 00A7 B751            STA     DBCNT
141: 00A9 B600            LDA     QUADS          ; SET OLDX TO CURRENT QUADRATURE ...
142: 00AB A403            AND     #03H
143: 00AD B740            STA     OLDX           ; ... GIVES A CLEAN START
144: 00AF B600            LDA     QUADS          ; SAME THING WITH Y
145: 00B1 44              LSRA
146: 00B2 44              LSRA
147: 00B3 A403            AND     #03H
148: 00B5 B742            STA     OLDY
149:
150: 00B7 A6D1            LDA     #TIMCNT
151: 00B9 B708            STA     TIMDAT         ; INITIALIZE TIMER
152: 00BB A601            LDA     #SERTIM
153: 00BD B709            STA     TIMCTL         ; PRESCALE BY 2
154: 00BF                 ;
155: 00BF                 ; CONFIGURE I/O PORTS
156: 00BF                 ;
157: 00BF A600            LDA     #ALLIN
158: 00C1 B704            STA     PADIR          ; PA0-7 INPUT
159: 00C3 A601            LDA     #B0OUT
160: 00C5 B701            STA     SEROUT         ; SET SERIAL OUTPUT LINE TO MARKING STATE
161: 00C7 B705            STA     PBDIR          ; PB0 OUTPUT, PB1-7 INPUT
162:
163: 00C9                 ;
164: 00C9                 ; OUTPUT A CHARACTER TO SHOW SUCCESSFUL INITIALIZATION
165: 00C9 A64D            LDA     #DIAGCH        ; OUTPUT CHARACTER TO SHOW LIFE
166: 00CB B748            STA     DATPAK
167: 00CD 4F              CLRA
168: 00CE B747            STA     PKTIDX         ; TRICK TIMER INTRPT SVC INTO SENDING DIAGCH
169: 00D0 9A              CLI                    ; ENABLE INTERRUPTS
170:
171:
172:
173:
```

175: AVOCET SYSTEMS 6805 CROSS-ASSEMBLER - VERSION 1.06
176:
177: SERIAL MOUSE DEVICE-RESIDENT SOFTWARE
178: QUADRATURE PROCESSING ROUTINES
179:
180:
181: 00D1            LOOP:
182: 00D1 B600              LDA     QUADS       ; GET  QUADRATURE SIGNALS
183: 00D3 B74A              STA     QDTEMP      ; SAVE QUADRATURE
184: 00D5 A403              AND     #03H        ; X SIGNALS APPEAR ON BITS 0 & 1 OF PORT
185: 00D7 97                TAX                 ; SAVE THIS TO STORE AS "OLDX" IN A MOMENT
186: 00D8 48                LSLA                ; MOVE TO BIT POSITIONS 2 & 3
187: 00D9 48                LSLA
188: 00DA BA40              ORA     OLDX        ; FORM INDEX USING PREVIOUS STATE
189: 00DC BF40              STX     OLDX        ; SAVE NEW OLDX
190: 00DE 97                TAX                 ; MOVE INDEX TO INDEX REGISTER
191: 00DF E600              LDA     T.TABLE,X   ; GET TRANSITION CODE INTO ACCUMULATOR
192: 00E1 270E              BEQ     GETY        ; IF TRANSITION CODE = 0, NO WORK TO DO
193: 00E3 B141              CMP     XDIR        ; IF DIRECTION HAS NOT CHANGED ...
194: 00E5 2704              BEQ     XCHNG       ; ... UPDATE COUNT
195: 00E7 B741              STA     XDIR        ; ELSE REMEMBER NEW DIRECTION
196: 00E9 2006              BRA     GETY        ; ... AND WE'RE DONE
197: 00EB            XCHNG:
198: 00EB 9B                SEI                 ; DISABLE INTERRUPTS DURING UPDATE
199: 00EC BB4C              ADD     DELTAX      ; UPDATE DELTA X COUNT (ADDS 1 OR -1)
200: 00EE B74C              STA     DELTAX      ;
201: 00F0 9A                CLI
202: 00F1                   ;
203: 00F1                   ; DO THE SAME WITH Y-AXIS ENCODER SIGNALS
204: 00F1                   ;
205: 00F1            GETY:
206: 00F1 B64A              LDA     QDTEMP      ; GET QUADRATURE SIGNALS
207: 00F3 A40C              AND     #0CH        ; Y SIGNALS APPEAR ON BITS 2 & 3 OF PORT
208: 00F5 BA42              ORA     OLDY        ; FORM INDEX USING PREVIOUS STATE
209: 00F7 97                TAX                 ; MOVE INDEX TO INDEX REGISTER
210: 00F8 E600              LDA     T.TABLE,X   ; GET TRANSITION CODE INTO ACCUMULATOR
211: 00FA 270E              BEQ     YDONE       ; IF TRANSITION CODE = 0, NO WORK TO DO
212: 00FC B143              CMP     YDIR        ; IF DIRECTION HAS NOT CHANGED ...
213: 00FE 2704              BEQ     YCHNG       ; ... UPDATE COUNT
214: 0100 B743              STA     YDIR        ; ELSE REMEMBER NEW DIRECTION
215: 0102 2006              BRA     YDONE       ; ... AND WE'RE DONE
216: 0104            YCHNG:
217: 0104 9B                SEI
218: 0105 BB4D              ADD     DELTAY      ; UPDATE DELTA Y COUNT (ADDS 1 OR -1)
219: 0107 B74D              STA     DELTAY      ;
220: 0109 9A                CLI
221: 010A            YDONE:
222: 010A 54                LSRX                ; NEW SAMPLE BECOMES PREVIOUS SAMPLE
223: 010B 54                LSRX
224: 010C BF42              STX     OLDY
225: 010E                   ;
226: 010E 20C1              BRA     LOOP        ; DO IT AGAIN
227:
228:
229:
230:
231: AVOCET SYSTEMS 6805 CROSS-ASSEMBLER - VERSION 1.06
232:

233: SERIAL MOUSE DEVICE-RESIDENT SOFTWARE
234: TIMER INTERRUPT SERVICE ROUTINES   (SERIAL COMM, BUTTON PROCESSING)
235:
236:
237:
238: 0110                    ;
239: 0110                    ; **** TIMER INTERRUPT SERVICE ENTRY POINT ****
240: 0110                    ;
241: 0110        TIMINT:
242: 0110
243: 0110 A6D1           LDA    #TIMCNT
244: 0112 B708           STA    TIMDAT      ; RELOAD TIMER
245: 0114 1F09           BCLR   7,TIMCTL    ; CLEAR TIMER INTERRUPT REQUEST FLAG
246: 0116                    ;
247: 0116                    ; IF ANY BIT TO OUTPUT, DO IT FIRST FOR CONSISTENT BIT TIMING
248: 0116                    ;
249: 0116 B646           LDA    BITCNT      ; IF ANY BIT TO OUTPUT, DO IT NOW
250: 0118 271C           BEQ    GETNXT      ; ELSE LOOK FOR MORE DATA TO SEND
251: 011A BE45           LDX    NXTBIT      ; NXTBIT WAS SET UP BY PREVIOUS INTERRUPT
252: 011C BF01           STX    SEROUT      ; SO IT COULD BE SENT IN A TIMELY FASHION
253: 011E 4A             DECA               ; ONE LESS BIT TO SEND IN THIS FRAME
254: 011F B746           STA    BITCNT      ; SAVE UPDATED BIT COUNT
255: 0121 2713           BEQ    GETNXT      ; IF THAT WAS THE LAST BIT, GO SET UP NEXT BYTE
256: 0123 A102           CMP    #NUMSB      ; ELSE IF WE'RE DOWN TO THE STOP BITS...
257: 0125 2309           BLS    STPNXT      ; ... GO SET THEM UP
258: 0127 B644           LDA    XMTREG      ; ELSE SET UP NEXT DATA BIT
259: 0129 B745           STA    NXTBIT
260: 012B 44             LSRA               ; ... READY XMTREG FOR NEXT PASS
261: 012C B744           STA    XMTREG
262: 012E 2012           BRA    BUTNS       ; AND GO LOOK AT THE BUTTONS
263:
264: 0130        STPNXT:
265: 0130 A601           LDA    #STOPBIT    ; READY A STOP BIT FOR TRANSMISSION
266: 0132 B745           STA    NXTBIT
267: 0134 200C           BRA    BUTNS
268:
269: 0136        GETNXT:
270: 0136 AD35           BSR    GNB         ; GET NEXT DATA BYTE
271: 0138 2408           BCC    BUTNS       ; RETURNS WITH CARRY CLEAR IF NO DATA
272: 013A B744           STA    XMTREG      ; STORE DATA IN TRANSMIT REGISTER
273: 013C A60A           LDA    #FRMSIZ     ; INITIALIZE BIT COUNT TO FRAME SIZE
274: 013E B746           STA    BITCNT
275: 0140 B745           STA    NXTBIT      ; RDY A STARTBIT; WONT WORK IF FRMSIZ CHANGES
276: 0142                    ;
277: 0142                    ;
278: 0142                    ; BUTTON PROCESSING ROUTINES - SCAN AND DEBOUNCE MOUSE BUTTONS
279: 0142                    ;
280: 0142        BUTNS:
281: 0142 B651           LDA    DBCNT       ; IF NOT DEBOUNCING A TRANSITION ...
282: 0144 2B17           BMI    RDBUT       ; ... GO READ THE BUTTONS
283: 0146 2704           BEQ    CKBUT       ; IF DEBOUNCE INTERVAL OVER, CK VALID XITION
284: 0148 4A             DECA               ; ELSE DECREMENT DEBOUNCE COUNT
285: 0149 B751           STA    DBCNT       ;   SAVE IT
286: 014B 80             RTI                ;   AND RETURN
287:
288:
289: AVOCET SYSTEMS 6805 CROSS-ASSEMBLER -  VERSION 1.06
290:
291: SERIAL MOUSE DEVICE-RESIDENT SOFTWARE

292: TIMER INTERRUPT SERVICE ROUTINES  (SERIAL COMM, BUTTON PROCESSING)
293:
```
294: 014C          CKBUT:
295: 014C 4A              DECA
296: 014D B751            STA     DBCNT           ; SET DEBOUNCE COUNT TO -1
297: 014F B600            LDA     BUTDAT          ; GET CURRENT BUTTON DATA
298: 0151 43              COMA                    ; INVERT BUTTON POLARITY
299: 0152 A430            AND     #BUTMSK         ; ONLY WANT THE BUTTON INFO
300: 0154 B14E            CMP     OLDBUT          ; IF NEW BUTTON STATE DIFFERENT FROM OLD ...
301: 0156 2604            BNE     CKRET           ; ... NOT A VALID BUTTON STATE CHANGE
302: 0158 B750            STA     DEBNCD          ; ELSE A VALID XITION, SAVE BUTTON STATE
303: 015A 104F            BSET    0,BUTCHG        ;    AND SET THE BUTTON CHANGED FLAG
304: 015C 80      CKRET:  RTI                     ; RETURN
305: 015D                 ;
306: 015D         RDBUT:
307: 015D B600            LDA     BUTDAT          ; GET CURRENT BUTTON DATA
308: 015F 43              COMA                    ; INVERT BUTTON POLARITY
309: 0160 A430            AND     #BUTMSK         ; ONLY WANT THE BUTTON INFO
310: 0162 B150            CMP     DEBNCD          ; IF NEW DATA SAME AS DEBOUNCED DATA ...
311: 0164 2706            BEQ     RDRET           ; ... RETURN
312: 0166 B74E            STA     OLDBUT          ; ELSE ... SAVE NEW AS OLD FOR DEBOUNCE CHECK
313: 0168 A608            LDA     #MAXCNT         ;    AND INITIALIZE DEBOUNCE COUNTER
314: 016A B751            STA     DBCNT           ;
315: 016C 80      RDRET:  RTI                     ; RETURN
316: 016D                 ;
317: 016D                 ; GET NEXT BYTE FROM DATA PACKET
318: 016D                 ;
319: 016D                 ; CHECKS THE PACKET INDEX:  IF NON-NEGATIVE, RETURNS THE NEXT DATA
320: 016D                 ; BYTE IN ACCUMULATOR AND SETS THE CARRY FLAG.  IF INDEX WAS NEGATIVE,
321: 016D                 ; CHECKS FOR NEW DATA TO SEND.
322: 016D                 ;
323: 016D         GNB:
324: 016D BE47            LDX     PKTIDX          ; IF PACKET INDEX IS NEGATIVE
325: 016F 2B07            BMI     CKDATA          ; ... NO PACKET IN PROGRESS; CK FOR NEW DATA
326: 0171 E648            LDA     DATPAK,X        ; ELSE ... GET NEXT DATA BYTE
327: 0173 5A              DECX                    ;    UPDATE PACKET INDEX
328: 0174 BF47            STX     PKTIDX          ;    SAVE IT
329: 0176 99              SEC                     ;    SET CARRY TO SHOW NEW DATA
330: 0177 81              RTS                     ;    AND RETURN
331: 0178         CKDATA:
332: 0178 B64C            LDA     DELTAX          ; IF NON-ZERO X DATA ...
333: 017A 2609            BNE     PAKDAT          ; ... PACK DATA INTO TABLE
334: 017C B64D            LDA     DELTAY          ; ELSE IF NON-ZERO Y DATA ...
335: 017E 2605            BNE     PAKDAT          ; ... PACK DATA INTO TABLE
336: 0180 004F02          BRSET   0,BUTCHG,PAKDAT ; ELSE IF BUTNS CHANGED ... PACK DATA INTO TBL
337: 0183 98              CLC                     ; ELSE ... CLEAR CARRY TO SHOW NOTHING TO SEND
338: 0184 81              RTS                     ;    AND RETURN
339: 0185         PAKDAT:
340: 0185 B64C            LDA     DELTAX          ; GET DELTA X COUNT
341: 0187 97              TAX                     ; SAVE A COPY
342: 0188 A43F            AND     #3FH            ; MASK UPPER TWO BITS
343: 018A B749            STA     DELX            ; STORE IT AS SECOND BYTE IN DATA PAK
344: 018C 9F              TXA                     ; GET VIRGIN COPY BACK
```
345:
346:
347: AVOCET SYSTEMS 6805 CROSS-ASSEMBLER - VERSION 1.06
348:
349: SERIAL MOUSE DEVICE-RESIDENT SOFTWARE
350: TIMER INTERRUPT SERVICE ROUTINES   (SERIAL COMM, BUTTON PROCESSING)

```
351:
352: 018D A4C0          AND    #0C0H         ; SCRAP OTHER BITS
353: 018F 44            LSRA
354: 0190 44            LSRA
355: 0191 B74B          STA    TEMP          ; WISH THIS CHIP HAD ANOTHER REGISTER
356: 0193 B64D          LDA    DELTAY        ; SIMILARLY WITH DELTA Y COUNT
357: 0195 97            TAX
358: 0196 A43F          AND    #3FH
359: 0198 B748          STA    DELY          ; STORE AS LAST BYTE IN DATA PAK
360: 019A 9F            TXA
361: 019B A4C0          AND    #0C0H
362: 019D BA4B          ORA    TEMP
363: 019F 44            LSRA                 ; DELTAY'S TWO MSB'S GO TO BIT POS'NS 2 AND 3
364: 01A0 44            LSRA                 ; DELTAX'S GO TO BIT POS'NS 0 AND 1
365: 01A1 44            LSRA
366: 01A2 44            LSRA
367: 01A3 BA50          ORA    DEBNCD        ; OR IN DEBOUNCED BUTTON DATA
368: 01A5 AA40          ORA    #SYNCBIT      ; OR IN SYNC BIT
369: 01A7 5F            CLRX
370: 01A8 BF4C          STX    DELTAX        ; CLEAR DELTA X COUNT
371: 01AA BF4D          STX    DELTAY        ; CLEAR DELTA Y COUNT
372: 01AC BF4F          STX    BUTCHG        ; CLEAR BUTTON CHANGE FLAG
373: 01AE 5C            INCX
374: 01AF BF47          STX    PKTIDX        ; POINT PACKET INDEX TO X COUNT
375: 01B1 99            SEC                  ; SET CARRY TO SHOW VALID DATA
376: 01B2 81            RTS                  ; AND RETURN
377:
378:
379:
380:
381: AVOCET SYSTEMS 6805 CROSS-ASSEMBLER - VERSION 1.06
382:
383: SERIAL MOUSE DEVICE-RESIDENT SOFTWARE
384: COPYRIGHT; RESET AND INTERRUPT VECTORS
385:
386:
387: 01B3 436F7079       DB     'Copyright 1983, MICROSOFT CORPORATION'
388: 01D8 20627920       DB     ' by JCH '
389:
390: 01E0               ;
391: 01E0               ; RESTART AND INTERRUPT VECTORS
392: 01E0               ;
393: 07F6                ORG    7F6H
394:
395: 07F6 0090           DW     START         ; TIMER WAIT-MODE INTERRUPT VECTOR
396: 07F8 0110           DW     TIMINT        ; TIMER INTERRUPT VECTOR
397: 07FA 0090           DW     START         ; EXTERNAL INTERRUPT VECTOR
398: 07FC 0090           DW     START         ; SOFTWARE INTERRUPT VECTOR
399: 07FE 0090           DW     START         ; RESET VECTOR
400:
401: 0000                END
402:
403:
404: AVOCET SYSTEMS 6805 CROSS-ASSEMBLER - VERSION 1.06
405:
406: SERIAL MOUSE DEVICE-RESIDENT SOFTWARE
407: ---- SYMBOL TABLE ----
408:
409: ALLIN    0000       DELTAX  004C    MSKOPT  0000    QDTEMP  004A    TIMCNT  00D1
```

| | | | | | | | | | |
|---|---|---|---|---|---|---|---|---|---|
| 410: | BSOUT | 0001 | DELTAY | 004D | NOCHNG | 0000 | QUADS | 0000 | TIMCTL | 0009 |
| 411: | BITCNT | 0046 | DELX | 0049 | NUMSB | 0002 | RDBUT | 015D | TIMDAT | 0008 |
| 412: | BUTCHG | 004F | DELY | 0048 | NXTBIT | 0045 | RDRET | 016C | TIMINT | 0118 |
| 413: | BUTDAT | 0000 | DIAGCH | 004D | OLDBUT | 004E | RIGHT | 0001 | XCHNG | 00EB |
| 414: | BUTMSK | 0030 | FRMSIZ | 000A | OLDX | 0040 | SEROUT | 0001 | XDIR | 0041 |
| 415: | BUTNS | 0142 | GETNXT | 0136 | OLDY | 0042 | SERTIM | 0001 | XMTREG | 0044 |
| 416: | CKBUT | 014C | GETY | 00F1 | PADAT | 0000 | START | 0090 | YCHNG | 0104 |
| 417: | CKDATA | 0178 | GMB | 016D | PADIR | 0004 | STOPBIT | 0001 | YDIR | 0043 |
| 418: | CKRET | 015C | ILLEGAL | 0000 | PAKDAT | 0185 | STPNXT | 0130 | YDONE | 010A |
| 419: | DATPAK | 0048 | LEFT | FFFF | PBDAT | 0001 | SYNCBIT | 0040 | | |
| 420: | DBCNT | 0051 | LOOP | 00D1 | PBDIR | 0005 | T.TABLE | 0080 | | |
| 421: | DEBNCD | 0050 | MAXCNT | 0008 | PKTIDX | 0047 | TEMP | 004B | | |

I claim:

1. In a computer peripheral device for positioning a cursor on a computer display, said device including means for generating X-Y information, said device comprising:
   processing means for converting said X-Y information to a serial format;
   an interface having a plurality of control and data lines of a general purpose peripheral port of a host computer, said interface including a data line coupled to said processing means; and
   means, coupled to at least one of said control and data lines, for providing power to said generating and processing means.

2. A device as set forth in claim 1 wherein said generating means includes means for generating said X-Y information in response to manual inputs.

3. A device as set forth in claim 2 wherein said means for providing power is coupled to first and second ones of said control or data lines, said first control or data line having a positive predetermined state and said second control or data line having a negative predetermined state.

4. The device of claim 3 wherein said interface is an RS-232 format interface, said first control or data line is a RTS line and said second control or data line is a TXD line.

5. The device of claim 3 wherein said means for providing power comprises a zener diode coupled between said second control or data line and a power input of said processing means and a series combination of a diode and a resistor coupled between said first control or data line and said power input of said processing means.

6. The device of claim 3 further comprising a transistor having a control electrode coupled to a data output of said processing means, a second electrode coupled to said control or data line and a third electrode coupled to said second control or data line and a third electrode coupled to said second control or data line.

7. A device as set forth in claim 1 wherein said processing means includes a microprocessor coupled to said generating means.

8. The device of claim 1 wherein said means for providing power includes means for maintaining power at a predetermined polarity.

9. A computer mouse peripheral device, comprising:
   means for generating X-Y data based on movement of said mouse in an X-Y plane;
   processing means for converting said X-Y data to a serial format;
   an interface having a plurality of control and data lines of a general purpose peripheral port of a host computer, said interface including a data line coupled to said means for processing data;
   means, coupled to said plurality of control or data lines, for providing power to said means for processing data from said plurality of control or data lines, wherein at least one control or data line has a positive predetermined state and at least one control or data line has a negative predetermined state; and
   means for maintaining said power at a predetermined polarity.

10. A computer system comprising:
    a computer mouse peripheral device, including information means for generating and encoding X-Y information based on the location of said mouse peripheral device relative to an initial position;
    a general purpose peripheral interface having a plurality of control and data lines;
    means, coupled to a pair of said control or data lines for providing power to said generating and encoding means;
    a host computer coupled to said general purpose peripheral interface;
    means, coupled to said general purpose peripheral interface control or data lines, for placing a predetermined voltage thereon; and
    a plurality of signal lines coupling said general purpose peripheral interface to said host computer.

11. An improved device for positioning a cursor on a computer display, said device coupled to a general purpose peripheral port of a computer and having serial data lines and a plurality of control lines, said device comprising:
    first means for detecting movement of the device in a first direction and generating a first signal in response thereto;
    second means for detecting movement of the device in a second direction perpendicular to said first direction and generating a second signal in response thereto;
    processing means coupled to said first and second means for detecting movement, said processing means for converting the signals generated by said first and second means for detecting movement into a serial data stream, said processing means having a power supply input and a means for outputting said serial data stream to said serial data lines of said peripheral port; and
    means for deriving power from at least one of said serial data lines or control lines of said peripheral port, said means for deriving power coupled to said power input of said processing means.

12. The apparatus of claim 11 wherein said plurality of serial data lines of said general purpose peripheral port include at least one line used for the transmission of data to said computer and at least one line used for receiving data from said computer.

13. An improved device for positioning a cursor on a computer display, said device coupled to a general purpose peripheral port of a computer having serial data lines and a plurality of control lines, said device comprising;
- means for detecting movement of the device in an X-Y plane and generating a signal in response thereto;
- processing means coupled to said means for detecting movement, said processing means for converting the signal generated by said means for detecting movement into a serial data stream, said processing means having a power supply input and a means for outputting said serial data stream to at least one of said serial data lines of said general purpose peripheral port; and
- means for deriving power from at least one of said serial data lines or control lines of said general purpose peripheral port, said means for deriving power coupled to said power supply input of said processing means.

14. An improved device for positioning a cursor on a computer display, said device coupled to a general purpose peripheral port of a computer and having serial data lines and a plurality of control lines, said device comprising:
- means for detecting movement of the device in an X-Y plane and generating a signal in response thereto;
- converting means coupled to said means for detecting movement, said converting for converting the signal generated by said means for detecting movement into a serial data stream, said converting means having a power supply input and a means for outputting said serial data stream to said serial data lines of said general purpose peripheral port; and
- means for deriving power from at least one of said serial data lines or control lines of said general purpose peripheral port, said means for deriving power coupled to said power supply input of said converting means.

15. A method for positioning a cursor on a computer screen with a mouse, said method comprising the steps of:
- coupling the mouse to a general purpose serial port of a computer, said serial port having control and data lines;
- generating an X-Y signal in response to movement of said mouse in an X-Y plane with a generating means;
- converting said X-Y signal to a serial format with a converting means;
- outputting said X-Y signal to said computer through said general purpose serial port;
- converting said X-Y signal to a X-Y position on a computer screen; and
- displaying said X-Y position with a cursor on a computer screen.

16. The method of claim 15 further including the steps of deriving power for said generating means and said converting means from control or data lines of said general purpose serial port.

* * * * *

UNITED STATES PATENT AND TRADEMARK OFFICE
CERTIFICATE OF CORRECTION

PATENT NO. : 4,866,602

DATED : September 12, 1989

INVENTOR(S) : John C. Hall

It is certified that error appears in the above-identified patent and that said Letters Patent is hereby corrected as shown below:

In claim 6, column 19, lines 55-56, delete "and a third electrode coupled to said second control or data line"

In claim 14, column 21, line 31, following "said converting" insert --means--.

Signed and Sealed this

Twenty-sixth Day of March, 1991

Attest:

HARRY F. MANBECK, JR.

Attesting Officer

Commissioner of Patents and Trademarks

Disclaimer 4,866,602—*John C. Hall*, Redmond, Wash. POWER SUPPLY FOR A COMPUTER PERIPHERAL DEVICE WHICH POSITIONS A CURSOR ON A COMPUTER DISPLAY. Patent dated Sept. 12, 1989. Disclaimer filed July 8, 1991, by the assignee, Microsoft Corp.

Hereby enters this disclaimer to claim 15 of said patent.
*[ Official Gazette November 5, 1991. ]*